United States Patent Office 3,287,407
Patented Nov. 22, 1966

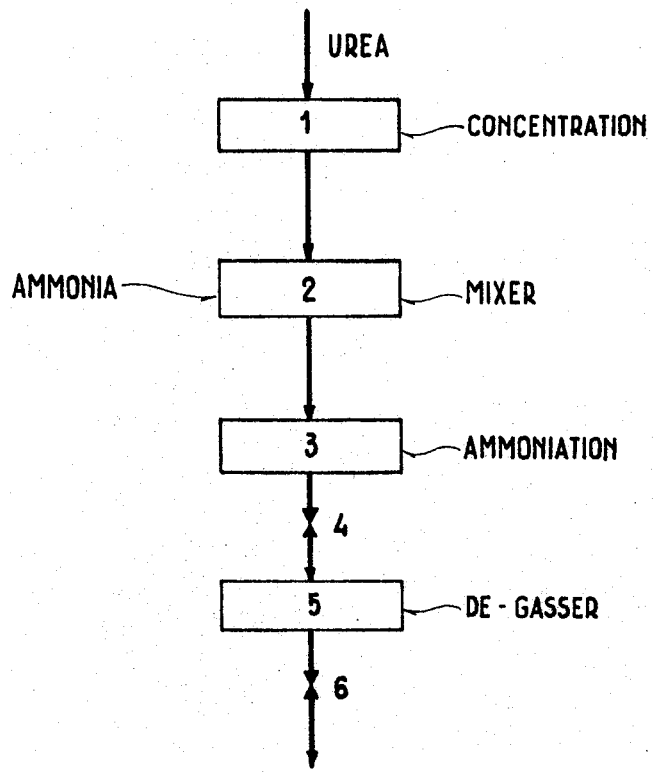

3,287,407
PURIFICATION OF UREA
Umberto Zardi, Milan, Italy, assignor to Montecatini Società Generale per l'Industria Mineraria e Chimica, Milan, Italy
Filed Nov. 23, 1962, Ser. No. 239,464
Claims priority, application Italy, Nov. 28, 1961, 21,406/61
2 Claims. (Cl. 260—555)

This invention relates to the production of urea and, in particular, to the production of high purity urea practically free from biuret and from free ammonia. The product is suitable not only as a fertilizer but also in various industrial applications, such as in the manufacture of resins and for pharmaceutical purposes.

Recently, industrial production of urea has been influenced in a direction towards the prilled product, which is obtained from molten urea having a residual water content comprised between 0.2 and 0.5%, by known granulation methods.

This type of urea is preferable to products subjected to final drying, obtained from a solution containing 1-2% of water. Since it is not dried, it is not porous and has a higher density, and also a higher resistance to crushing. It therefore has a lower tendency to agglomeration. The aqueous urea solutions obtained by various known processes are therefore subjected to a high concentration until molten urea is obtained.

The main problem encountered in this high concentration treatment is concerned with the decomposition products of urea formed at the temperatures involved, even when operating under a high vacuum and with very short residence times of the solution in the concentration devices.

It is known that at above 100° C. urea decomposes at a high rate, leading to the formation of a number of compounds, such as cyanic acid, biuret and triuret, accompanied by development of ammonia.

It is therefore of considerable industrial interest to obtain a very pure urea which is practically free from these decomposition products. The absence of biuret and of free ammonia is particularly required.

Biuret is harmful for a number of agricultural applications of urea. Free ammonia raises the pH value of the product, making it unsuitable for a number of commercial applications.

An object of the present invention is an economic process for obtaining high purity urea from practically anhydrous molten urea.

The process of the invention consists essentially in mixing molten urea with ammonia, then subjecting it to an ammoniation treatment, and then removing excess $NH_3$ by stripping in a current of air or other gas.

The process of the invention will be described with reference to the accompanying schematic drawing.

Urea from a urea concentration section 1 is effectively mixed with ammonia in a mixer 2 and kept for a short period of time in an ammoniation device 3, which can simply consist of a section of pipe, under a pressure of 2 to 80 atmospheres.

The intimate mixing of ammonia with urea accelerates, considerably, the retrograde reaction of biuret and the other decomposition compounds of urea, and makes it possible to operate with small amounts of ammonia introduced into the system under low pressure, preferably 2 to 15 atmospheres.

The residence time of the urea in the ammoniation device 3 is reduced to a few minutes, preferably 30 to 900 seconds. The amount of ammonia introduced into the system is reduced to a few grams per kilogram of urea, preferably 0.5 to 3 g./kg. of urea. The temperature is preferably from 120° to 150° C.

Urea, coming from the ammoniation circuit 3, is then passed through an expansion valve 4 to a degasser 5, working under a pressure of 0.2 to 1 atmosphere, in which the free ammonia contained in the urea is eliminated with the aid of hot air at 110 to 140° C. or other gas.

The high purity urea is withdrawn, still in the molten state, through a valve 6 and is then treated according to known processes for obtaining the prilled or granular product.

The process illustrated above makes it possible to obtain high purity urea in a very economical way, since it does not require the installation of a large apparatus to keep the urea under high pressure, and for recovering the ammonia used.

The very small amount of ammonia used in the process of the present invention makes its recovery pointless.

The following examples are given to illustrate preferred embodiments of the invention, but without intent to thereby limit the invention.

Example 1

Characteristics of molten urea treated according to the invention:

| | | |
|---|---|---|
| Biuret content | percent | 1 |
| Moisture content | do | 0.5 |
| Free ammonia content | p.p.m. | 300 |

Operating conditions in the purification system:

| | |
|---|---|
| Pressure, kg./cm.² | 15 |
| Temperature, ° C. | 140 |
| Duration of the solution, minutes | 10 |
| Ammonia introduced, g./kg. urea | 1 |

Characteristics of purified molten urea:

| | | |
|---|---|---|
| Biuret content | percent | 0.5 |
| Moisture content | do | 0.5 |
| Free ammonia content | p.p.m. | 80 |

Example 2

Characteristics of molten urea treated according to the invention:

| | | |
|---|---|---|
| Biuret content | percent | 0.7 |
| Moisture content | do | 0.5 |
| Free ammonia content | p.p.m. | 200 |

Operating conditions in the purification system:

| | |
|---|---|
| Pressure, kg./cm.² | 40 |
| Temperature, ° C. | 138 |
| Duration of the solution, minutes | 15 |
| Ammonia introduced g./kg. urea | 2 |

Characteristics of purified molten urea:

| | | |
|---|---|---|
| Biuret content | percent | 0.4 |
| Moisture content | do | 0.5 |
| Free ammonia content | p.p.m. | 100 |

Example 3

Characteristics of molten urea treated according to the invention:

| | | |
|---|---|---|
| Biuret content | percent | 0.5 |
| Moisture content | do | 0.4 |
| Free ammonia content | p.p.m. | 150 |

Operating conditions in the purification system:

| | |
|---|---|
| Pressure, kg./cm.² | 60 |
| Temperature, ° C. | 138 |
| Duration of the solution, minutes | 25 |
| Ammonia introduced, g./kg. urea | 2.5 |

Characteristics of purified molten urea:

| | |
|---|---|
| Biuret content _____percent__ | 0.2 |
| Moisture content _____do____ | 0.4 |
| Free ammonia content _____p.p.m__ | 90 |

The above examples are carried out as described above, namely the ammonia is first intimately mixed with the urea, and then introduced into the ammoniation device 3. The subsequent pressure release and degassing is also as described above.

From these examples it is evident that the process of the invention makes it possible to obtain a substantial removal of the decomposition products, and the almost complete elimination of free ammonia, thus obtaining a high purity product.

I claim:

1. A process for producing high purity urea, with a low biuret and ammonia content, which comprises mixing with substantially anhydrous molten urea containing biuret and free ammonia, 0.5 to 3 g. dry ammonia per kilogram of urea at a pressure of two to fifteen atmospheres, passing said mixture through an ammoniation zone at 120° C. to 150° C. and two to fifteen atmospheres for a dwell time of about 30 to 900 seconds in said ammoniation zone and stripping residual ammonia by hot air at about atmospheric pressure to give urea with a reduced biuret and ammonia content.

2. A process for producing high purity urea, with a low biuret and ammonia content, which comprises mixing with molten urea containing biuret, free ammonia and a water content of 0.2 to 0.5% 0.5 to 3 g. dry ammonia per kilogram of urea at a pressure of two to fifteen atmospheres, passing said mixture through an ammoniation zone at 120° C. to 150° C. and two to fifteen atmospheres for a dwell time of about one-half minute to twenty-five minutes in said ammoniation zone and stripping residual ammonia by releasing said pressure to give urea with a reduced biuret and ammonia content.

References Cited by the Examiner

UNITED STATES PATENTS

| | | | |
|---|---|---|---|
| 2,046,827 | 7/1936 | Lawrence et al. | 260—555 |
| 2,267,133 | 12/1941 | Porter | 260—555 |
| 2,854,482 | 9/1958 | Guyer | 260—555 |

FOREIGN PATENTS

| | | |
|---|---|---|
| 1,252,669 | 12/1960 | France. |
| 95,513 | 9/1960 | Netherlands. |

OTHER REFERENCES

Redemann et al.: Ind. and Eng. Chem., vol. 50, No. 4 (1958), pages 633–6.

ALEX MAZEL, *Primary Examiner.*

NICHOLAS S. RIZZO, *Examiner.*

H. R. JILES, *Assistant Examiner.*